(12) United States Patent
Themar

(10) Patent No.: US 6,378,457 B1
(45) Date of Patent: Apr. 30, 2002

(54) AQUATIC HABITAT EXTENSION DEVICE AND FEEDING APPARATUS THEREFOR

(76) Inventor: Charles E. Themar, 2112 Mayfield Cir., Corinth, TX (US) 76206

( * ) Notice: Subject to any disclaimer, the term of this patent is extended or adjusted under 35 U.S.C. 154(b) by 0 days.

(21) Appl. No.: 09/502,715

(22) Filed: Feb. 11, 2000

Related U.S. Application Data

(63) Continuation-in-part of application No. 09/149,396, filed on Sep. 8, 1998, now Pat. No. 6,039,005.

(51) Int. Cl.$^7$ ................................................ A01K 61/02
(52) U.S. Cl. ..................................................... 119/51.04
(58) Field of Search .......................... 119/51.04; 294/3, 294/22, 26.5, 153

(56) References Cited

U.S. PATENT DOCUMENTS

| 46,801 A | * | 3/1865 | Ivers ........................... 119/255 |
| 1,648,906 A | * | 11/1927 | Lubrano ........................ 99/323 |
| 1,871,742 A | * | 8/1932 | Sabath ......................... 119/253 |
| 1,943,417 A | * | 1/1934 | Bringman ..................... 119/249 |
| 3,320,928 A | * | 5/1967 | Smith .......................... 119/200 |
| 3,374,771 A | * | 3/1968 | Michie et al. ................ 119/255 |
| 3,903,844 A | * | 9/1975 | Greenia ....................... 119/250 |
| 3,921,584 A | * | 11/1975 | Scantlin ....................... 119/249 |
| 3,991,715 A | * | 11/1976 | Gibson, Jr. ................... 119/249 |
| 4,951,607 A | * | 8/1990 | Lapeyre ....................... 119/253 |
| 5,009,188 A | * | 4/1991 | Yasui .......................... 119/253 |
| 5,067,439 A | * | 11/1991 | Hand ........................... 119/249 |
| 5,174,239 A | * | 12/1992 | Sato ............................ 119/249 |
| 5,282,438 A | * | 2/1994 | McLaughlin ................ 119/248 |
| 5,317,991 A | * | 6/1994 | Lee et al. .................... 119/249 |
| 5,447,123 A | * | 9/1995 | Hendrickson ............... 119/249 |
| 5,672,121 A | * | 9/1997 | Miller .................... 294/19.2 X |
| 5,779,291 A | * | 7/1998 | Forest ............................ 294/3 |

FOREIGN PATENT DOCUMENTS

| CA | 941248 | * | 2/1974 | ................ 119/259 |
| DE | 3028835 | * | 7/1982 | ................ 119/249 |
| FR | 2255845 | * | 7/1975 | ................ 119/257 |
| FR | 2604335 | * | 4/1988 | ................ 119/249 |
| GB | 2095961 | * | 10/1982 | ................ 119/249 |

* cited by examiner

*Primary Examiner*—Robert P. Swiatek
(74) *Attorney, Agent, or Firm*—Brown & Michaels, PC

(57) ABSTRACT

To increase the occasions when fish or other aquatic animals enter an aquatic habitat extension device, a feed delivery system delivers feed through the entryway and releases it so that it floats up to an air pocket trapped in the upper portion of an aquatic habitat extension device. The delivery system employs a feeding mechanism that releases feed into the transparent habitat structure. The feeding mechanism is delivered to the habitat either through the use of a feeding pole or feeding platform.

4 Claims, 12 Drawing Sheets

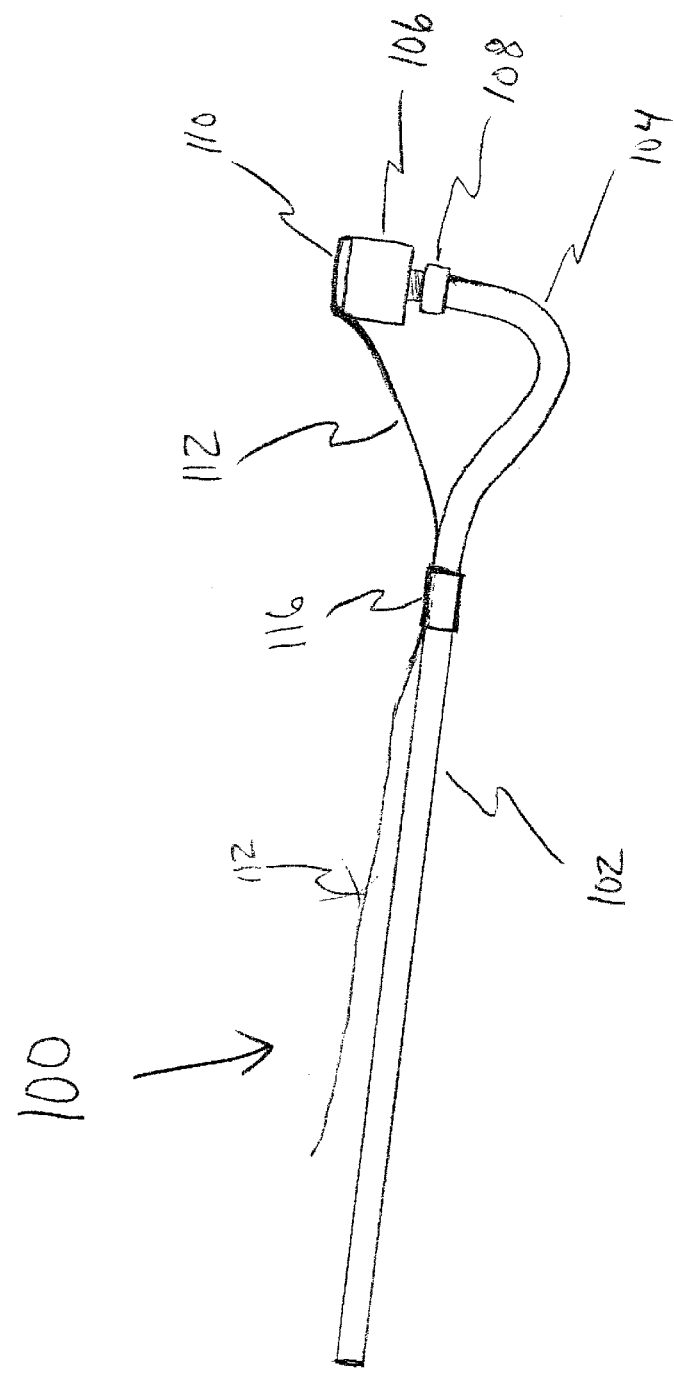

AQUATIC HABITAT EXTENSION DEVICE AND FEEDING APPARATUS THEREFOR

REFERENCE TO RELATED APPLICATION

This is a continuation-in-part patent application of copending application Ser. No. 09/149,396, filed Sep. 8, 1998, and now U.S. Pat. No. 6,039,005. The aforementioned application is hereby incorporated herein by reference in its entirety.

FIELD OF THE INVENTION

The invention pertains to an apparatus that extends the habitat of aquatic life above the surface of a body of water. More particularly, the invention pertains to a device that functions as a device for viewing aquatic animals above the surface of a body of water, when used in combination with aquariums, water gardens or the like.

BACKGROUND OF THE INVENTION

Aquariums and water gardens have long been known as habitats for aquatic life. The presence of these miniature aquatic environments is often used as a way to enhance the environment in which they are placed. In addition to their decorative role, aquariums and water gardens also act as sanctuaries and instructional tools in the observation of aquatic ecology.

Fish bridges, swimways or other types of aquarium extensions employing a partial vacuum to hold a volume of water above the surface of an aquarium are known. These extensions provide aquarium enthusiasts with the means to expand the habitat available to their aquatic animals and may also be used as a water-filled link between two or more separate aquaria. Once in place these aquarium extensions use a partial vacuum to defy the water line, retaining a given volume of water indefinitely. As long as the entrance to the bridge or swimway remains below the surface of the water in the underlying aquarium, and the extension maintains the integrity of the partial vacuum, there is no change in the water level inside the aquarium extension.

Examples of bridge assemblies and other aquarium extensions are disclosed in U.S. Pat. No. 5,447,123 (Hendrickson); U.S. Pat. No. 3,991,715 (Gibson Jr.); and U.S. Pat. No. 1,943,417 (Bringman). While these patents disclose the concept of an aquarium extension above the surface of an aquarium, none of them offer a method by which the water level inside the extension attachments is quickly and easily controlled by a user. As exemplified by the above patents, the prior art discloses only manual methods for changing the water volume in an extension attachment, typically involving the manual elimination of the vacuum by the user, after which the entire extension attachment must be submerged in the underlying aquarium or other body of water to regain the partial vacuum. Due to the necessity of manually filling or emptying an extension, the resulting size and number of extensions used is limited, thereby curtailing applications of aquarium extensions in anything other than small home aquariums.

In addition, existing aquarium extensions make no effort to attract aquatic life directly into the extension structure where the aquatic animals are easily observed by people. Instead, existing aquarium extensions rely on the animals to move into or through the structure by chance, limiting use of the extended habitat as a primary observation platform.

SUMMARY OF THE INVENTION

Briefly stated, an aquatic extension device employs a partial vacuum created by means for reversibly changing the water level inside a clear dome or other structure located above the surface of a pool, pond, or stream bed. The invention extends the aquatic habitat available to fish and other aquatic animals, turning the hollow above-water structure into an aquatic extension device for the observation of aquatic animals. These aquatic animals, typically fish, present inside an underlying aquarium, pool or larger body of water, become easily observable for a person standing outside the pool or on a nearby shore. An individual device can be used alone or with other similar aquatic habitat extensions that can be varied in terms of size, shape, opaqueness, and the degree to which they are filled with water.

The water level present inside the aquatic extension can be manipulated to completely or partially fill the hollow structure through the development of a partial vacuum drawing water in to take the place of air as it is evacuated. The partial vacuum is established through the placement of means for removing or adding air, such as, for example, a tube or evacuation line with one end located within the extension device to be evacuated and the other end attached to means capable of creating a partial vacuum, such as a vacuum pump. Optionally, a partial vacuum is created by mouth siphoning, wherein a person simply withdraws air from the hollow structure through a tube.

According to an embodiment, an aquatic habitat extension device for use in a body of water or an aquarium includes a transparent hollow habitat structure, wherein the structure includes a lower portion and an upper portion, the lower portion has an opening therein defined by a rim, the opening is oriented downward and below a surface of the body of water, and the opening is effective to permit entrance of aquatic animals. The embodiment also includes at least one support means for receiving the rim of the lower portion of the transparent habitat structure, such that the rim of the transparent habitat structure is supported above the bottom of the body of water or aquarium, and the rim is below the surface of the body of water.

To increase the occasions when fish or other aquatic animals enter an aquatic habitat extension device, a feed delivery system delivers feed through the entryway and releases it so that it floats up to an air pocket trapped in the upper portion of an aquatic habitat extension device. The delivery system employs a feeding mechanism that releases feed into the transparent habitat structure. The feeding mechanism is delivered to the habitat either through the use of a feeding pole or feeding platform.

According to an embodiment, a feeding apparatus for an aquatic habitat extension device includes an elongated shaft having a proximal end and a distal end, wherein said distal end is attached to feeding means that can be placed in an open or closed position by a user of the feeding apparatus, wherein the feeding means is capable of containing a feed mixture, and wherein the feeding means has opening and closing means for allowing a user to open and close the feeding means.

According to an embodiment, a feeding apparatus for an aquatic habitat extension device includes an elongated shaft having a proximal end and a distal end, operatively connected to a feed chamber for containing a feed mixture, a feed chamber cover that can be placed in an open position or a closed position, hingeably attached to the feed chamber, securing means for maintaining the feed chamber cover in a closed position until a user opens the feed chamber, opening means for opening the feed chamber, such that a feed mixture is released, and attaching means for attaching the feed chamber to the distal end of the elongated shaft.

According to an embodiment, a method of feeding aquatic animals includes the steps of providing a body of water with an aquatic habitat extension device, providing the body of water with aquatic animals, and delivering feed suitable for aquatic animals to the aquatic habitat extension device.

The aquatic habitat extension device itself is also be used in a decorative way to enhance the aesthetic qualities of water gardens, parks or other settings. Illuminating or tinting the habitat enhances the beauty of an aquarium, pond, water garden, or other body of water.

DESCRIPTION OF THE PREFERRED EMBODIMENT

Figure 1:
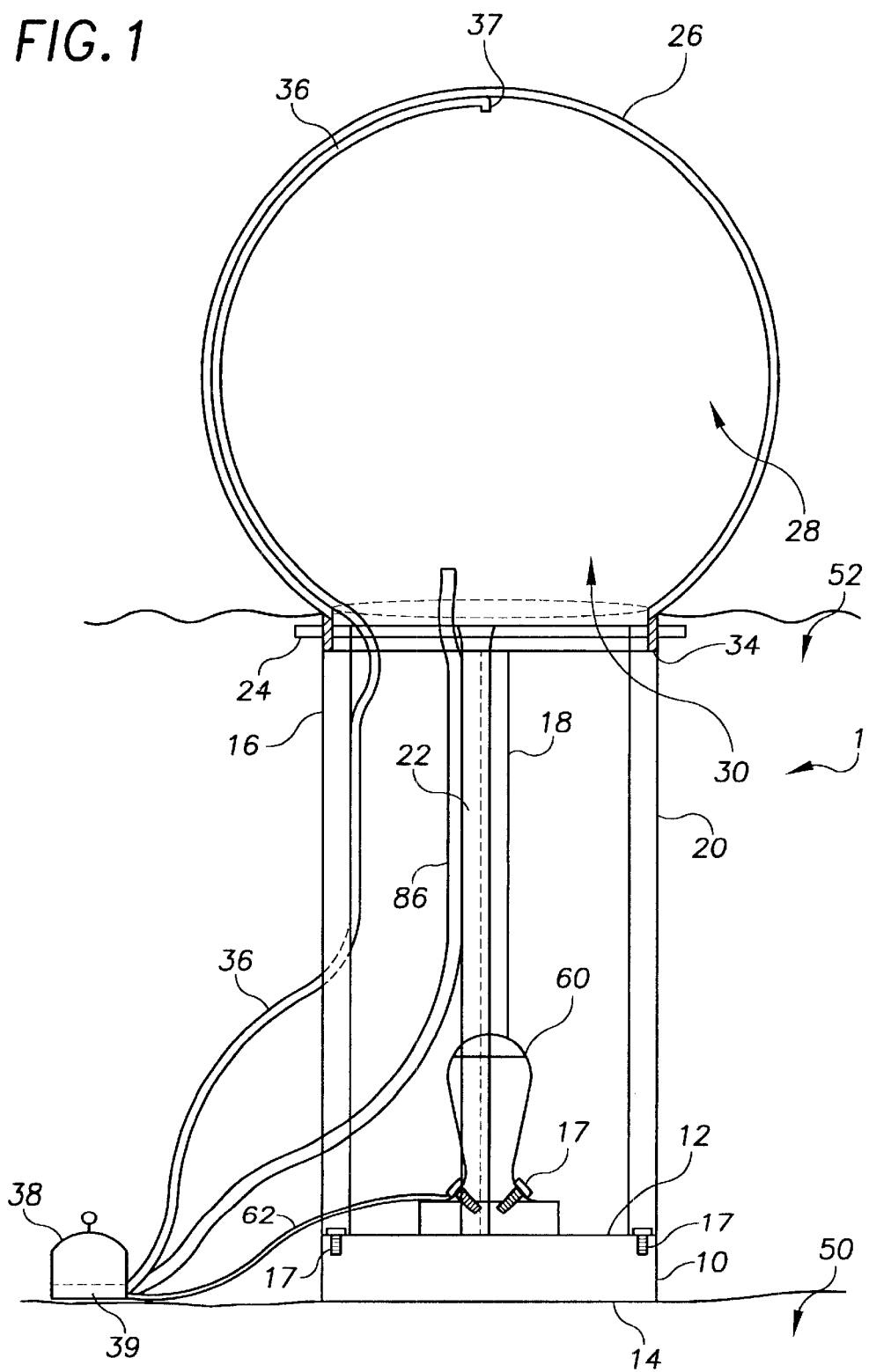
FIG. 1 shows a side elevation of an aquatic extension device with a transparent habitat structure in place.

Referring to FIG. 1, an aquatic habitat extension 1 of the invention includes a base 10 having an upper surface 12 and a substantially flat lower surface 14. Base 10 preferably is of sufficient weight and mass to securely anchor the aquatic habitat extension 1 to a bottom 50 of a body of water 52. Alternatively, base 10 can be secured to a support surface (not shown) capable of supporting the weight and anchoring aquatic habitat extension 1. In operation, lower surface 14 of base 10 is parallel to and in contact with the bottom 50 of the body of water 52. Support members 16, 18, 20 and 22 are fixedly attached to the upper surface 12 of base 10 and extend from the upper surface 12 of base 10 towards the surface of body of water 52. Support members 16, 18, 20 and 22 are designed to fixedly attach to a support collar 24, which in turn supports a transparent habitat structure 26. Support members 16, 18, 20 and 22 are preferably attached to base 10 and support collar 24 through the use of a plurality of galvanized screws 17 or other suitable fastening means which preferably do not rust in water. A water tube 86 forces water into interior chamber 28 from a water pump element (not shown).

Optionally, aquatic habitat extension 1 includes a light source 60 mounted on base 10 such that light source 60 is focused up from base 10 through inlet 30 and into an interior chamber 28. Light source 60 allows a more decorative display and aids in the observation of animals in transparent habitat structure 26 at night or in other low-light conditions. Power for the operation of light source 60 is supplied through a watertight powerline 62 that runs with an evacuation line 36 underneath line guides 38 through guide grooves 39 to an electrical power source (not shown). Evacuation line 36 is preferably made of a clear plastic or resin of the type typically employed in supplying air to aquarium filters and runs from an apex 37 of interior chamber 28 along the inner surface of transparent habitat structure 26 downward and out of habitat extension 1 through inlet 30 to attach to a circulation assembly (not shown), through which a user can control the water level in habitat extension 1. The user of habitat extension device 1 regulates the use of light source 60 to illuminate aquatic habitat extension 1 as desired. Light source 60 is fixedly attached to base 10 through the use of a plurality of galvanized screws 17 or other suitable fastening means that preferably do not rust in water. Optionally, light can be delivered into interior chamber 28 through the use of a fiber optic cable (not shown) connected to an electrical power source.

Preferably, four support members 16, 18, 20, and 22 are used to receive support collar 24 and provide the structural support necessary to maintain transparent habitat structure 28 above the surface of body of water 52. However, in alternate designs employing transparent habitat structures of variable size, the number and dimensions of support members used to structurally support a volume of aqueous media above a body of water larger is altered to maintain the structural integrity of the invention. For example, in an extremely small transparent habitat structure 28, only two support members may be needed to maintain structural integrity. In contrast, if a very large transparent habitat structure 28 is employed, larger and/or more numerous support members may be employed, as necessary.

Transparent habitat structure 26, support collar 24, and support members 16, 18, 20, and 22 are preferably made of a transparent plexi-glass, glass, thermoplastic resin, extruded acrylic compound, or equivalent transparent material sufficiently strong to maintain structural integrity and a partial vacuum when substantially filled with aqueous media. Any conventional means can be used to fixedly attach the transparent components of aquatic habitat extension 1 to base 10 and to other extensions 10, although galvanized screws 17 are preferred.

The length of, and distance between, support members 16, 18, 20, and 22 is preferably sufficient to allow aquatic animals of interest to move between them and into inlet 30. A partial vacuum must be established in transparent habitat structure 26 to maintain a volume of water above the surface of a body of water 52. The first step in the attachment of assembled base 10 and transparent habitat structure 26 to develop the completed aquatic habitat extension 1 is to mate peripheral rim 32 of transparent habitat structure 26 with support collar 24. During this mating, peripheral rim 32 is oriented in a downward orientation detachably connecting with and extending through support collar 24. Thereafter, peripheral rim 32 is preferably fixedly attached to support collar 24 through the use of a plurality of galvanized screws 17 or other rust proof conventional means. The leading edge 34 of peripheral rim 32 must be below the surface of body of water 52 in which base 10 rests. A transparent water tube 86 is used to force water into interior chamber 28 from a water pump element (not shown).

In a second embodiment of the aquatic habitat extension 1 the transparent habitat structure 26 is tinted so as to lessen the amount of external light entering interior chamber 28. Tinting protects any aquatic animals entering the habitat extension device 1 from bright sunlight magnified by the curvature and transparency of the transparent habitat structure 26. By making external observers of aquatic habitat extension device 1 less visible to aquatic animals inside interior chamber 28, tinting enhances the value of the habitat as a hiding place for aquatic animals. In this way aquatic animals are more likely to enter and remain in the habitat for viewing. However, in combination with the illumination provided by light source 60 aquatic animals in interior chamber 28 remain readily visible to external observers.

In a third embodiment, the transparent material used to fashion the aquatic extension device 1 is selected so that it magnifies in size any aquatic animal present in interior chamber 28. This magnification aids in the recreational value of the aquatic habitat extension device 1 since it makes the aquatic animals more visible to the observer.

Figure 2:
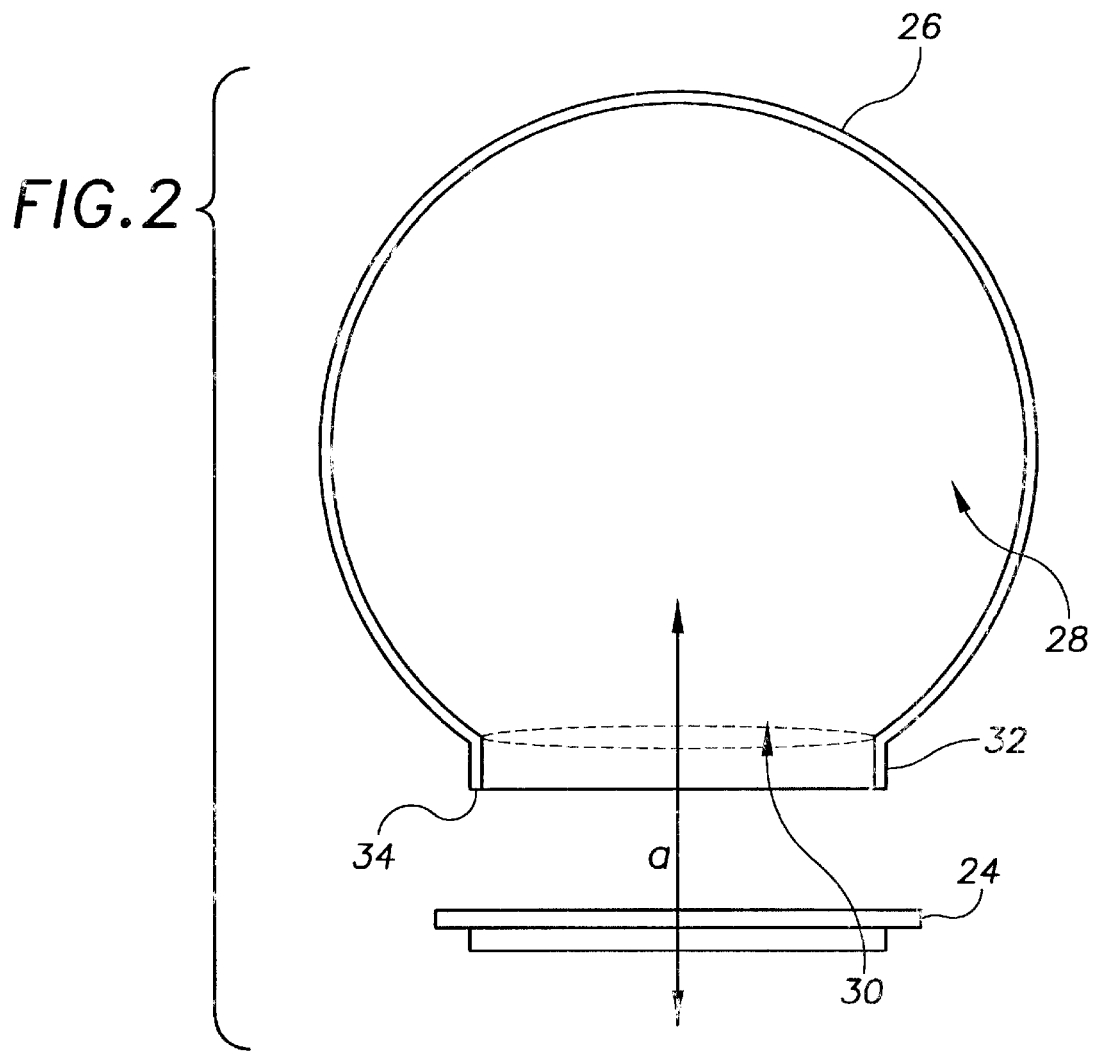
FIG. 2 shows a cut-away view of the transparent habitat structure of FIG. 1 and its mating attachment to the support collar.

Referring to FIG. 2, transparent habitat structure 26 has interior chamber 28 that fluidly communicates with body of water 52 through inlet 30, as shown by arrow "a". Interior chamber 28 preferably is of sufficient size to allow the display of animals or other aquatic phenomena of interest. The size and shape of inlet 30 is variable but must be sufficient to allow the entry and exit of aqueous media and animals of interest into interior chamber 28. Inlet 30 is bounded by a peripheral rim 32 extending in a plane that is perpendicular to the flow of arrow "a" and away from transparent habitat structure 28.

Figure 3:
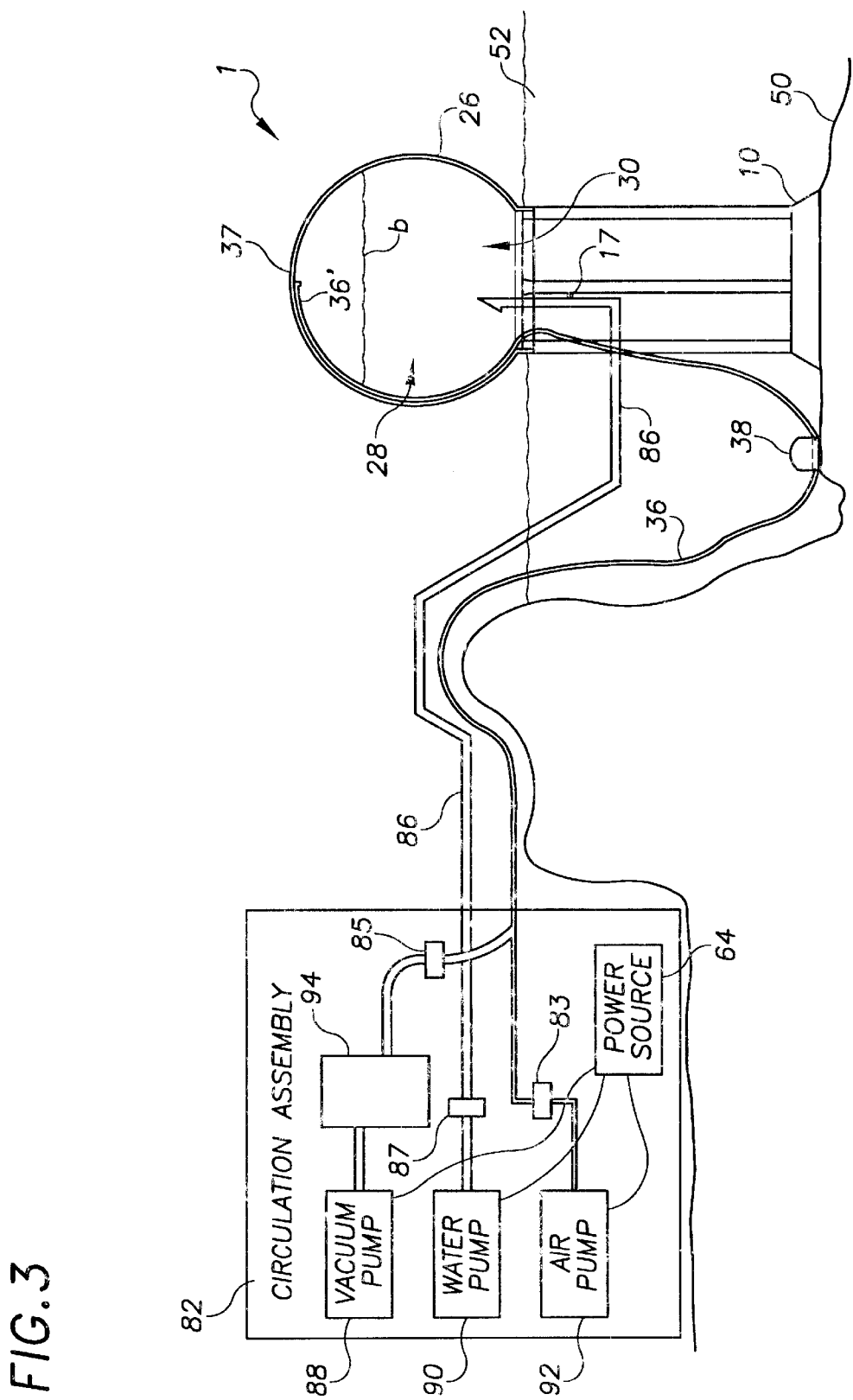
FIG. 3 shows the closed position of a feeder used to deliver feed to a transparent habitat structure.

Referring to FIG. 3, an open end of transparent evacuation line 36' extends from an apex 37 of interior chamber 28 along the inner surface of transparent habitat structure 26 downward through inlet 30 along the bottom 50 of body of water 52 to attach to a circulation assembly 82 or other means of establishing a partial vacuum through evacuation line 36, it is used to remove residual air from interior chamber 28. Through circulation assembly 82 a user can control the water level "b" in the habitat extension 1 by manipulating the partial vacuum present in interior chamber 28. Circulation assembly 82, through the establishment of a partial vacuum by a vacuum pump element 88 is employed to raise or lower the water level in interior chamber 28 by adding or removing air on the interior of habitat extension 1 through evacuation line 36. Circulation assembly 82 includes or is reversibly attached to a conventional power source 64 and contains vacuum pump element 88 a water pump element 90, and an air pump element 92. A user can attach these pump elements to evacuation line 36 as needed to achieve a desirable water level in habitat extension 1, dependent upon the desire of the user to evacuate air from transparent habitat structure 26 or force air or water into transparent habitat structure 26. Between vacuum pump element 88 and a second flow valve 85 a water 94 is positioned to prevent any water from the interior of habitat extension 1 from entering vacuum pump 88. Optionally, the water pump element can provide water to the transparent habitat structure 26 through evacuation line 36 that has first been cleaned or filtered through conventional means.

Circulation assembly 82 includes a first flow valve 83 operable to add, remove or maintain the air in an individual habitat. In an open position, first flow valve 83 permits air to enter the habitat from air pump element 92, or optionally the outside environment. In a closed position, first flow valve 83 prevents air from entering or leaving interior chamber 28. In a "vacuum" position, circulation assembly 82 removes air from the transparent habitat structure 26 through the use of vacuum pump element 88. In this position second flow valve 85 is opened to allow vacuum pump 88 to evacuate air from interior chamber 28 of habitat extension 1. When air is removed from an transparent habitat structure 26 a partial vacuum in the transparent habitat structure is created, strengthened or maintained concurrently with the diminishing amount of air in interior chamber 28. When a vacuum is established in the interior chamber 28 of habitat extension 1 any water entering evacuation line 36 is accumulated in water collector 64, thereafter being eliminated by conventional means when second flow valve 85 is closed.

In a variation of the preferred embodiment, circulation assembly 82 also includes a third flow valve 87 operable to introduce water into transparent habitat structure 26 through transparent water tube 86 and water pump element 90. In a closed position third flow valve 87 prevents any water from entering interior chamber 28. In an open position third flow valve 87 forces water through a transparent water tube 86 into transparent habitat structure 26. If the habitat is sufficiently free of water, the effect created by water pump element 90 is that of a fountain present inside the transparent aquatic habitat 26. Transparent water tube 86 is inserted into interior chamber 28 through inlet 30 and reversibly attached to support members 16, 18, 20, and 22 through the use of a plurality of galvanized screws 17 or other rustproof conventional means. Evacuation line 36 and transparent water tube 86 are held in place on the bottom 50 of body of water 52 through the use of a plurality of line guides 38. In the context of this invention water is a generic term applying to any aqueous medium capable of supporting aquatic life.

With an increase in the water pressure supplied by water pump element 90 through third flow valve 87 the water emanating from transparent water tube 86 is used to partially clean or remove debris found on the inner surface of transparent habitat structure 26. Alternatively, transparent water tube 86 is used to deliver compounds capable of cleaning the inner surface of transparent habitat structure 26, such as algicide, fungicides, or detergents. Other methods of cleaning the interior of transparent habitat structure 26 include the removal of transparent habitat structure 26 for manual cleaning or disposal. Alternatively, if the transparent habitat structure 26 is large enough, an individual can enter the interior chamber to clean the inner surface of transparent habitat structure 26.

It is important to note that when one of the three flow valves 83, 85 or 87 are open, the other two flow valves must be closed. When closed the various flow valves from an airtight and watertight seal between their respective element of circulation assembly 82 and habitat extension 1.

Figure 4A:
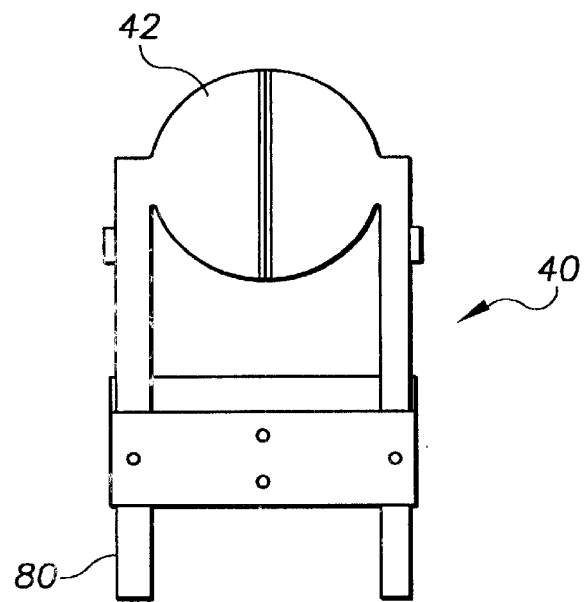
FIGS. 4A and 4B show, respectively, the closed and open positions of a feeder used to deliver feed to a transparent habitat structure.
Figure 4B:
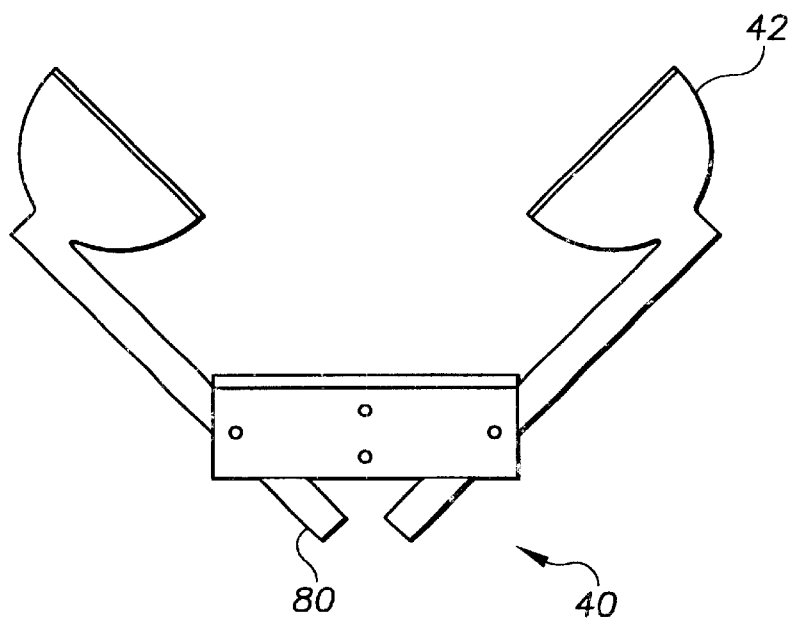

Referring to FIG. 4A–4B, a feeding assembly 40 is used to deliver feed (not shown) to a point just below inlet 30 of habitat extension 1 (see FIG. 1), to draw animals of interest into the interior chamber 28 of transparent habitat structure 26. The feeder 42 of feeding assembly 40 optionally is operatively connected to a feeding pole or a feeding platform.

Figure 5:
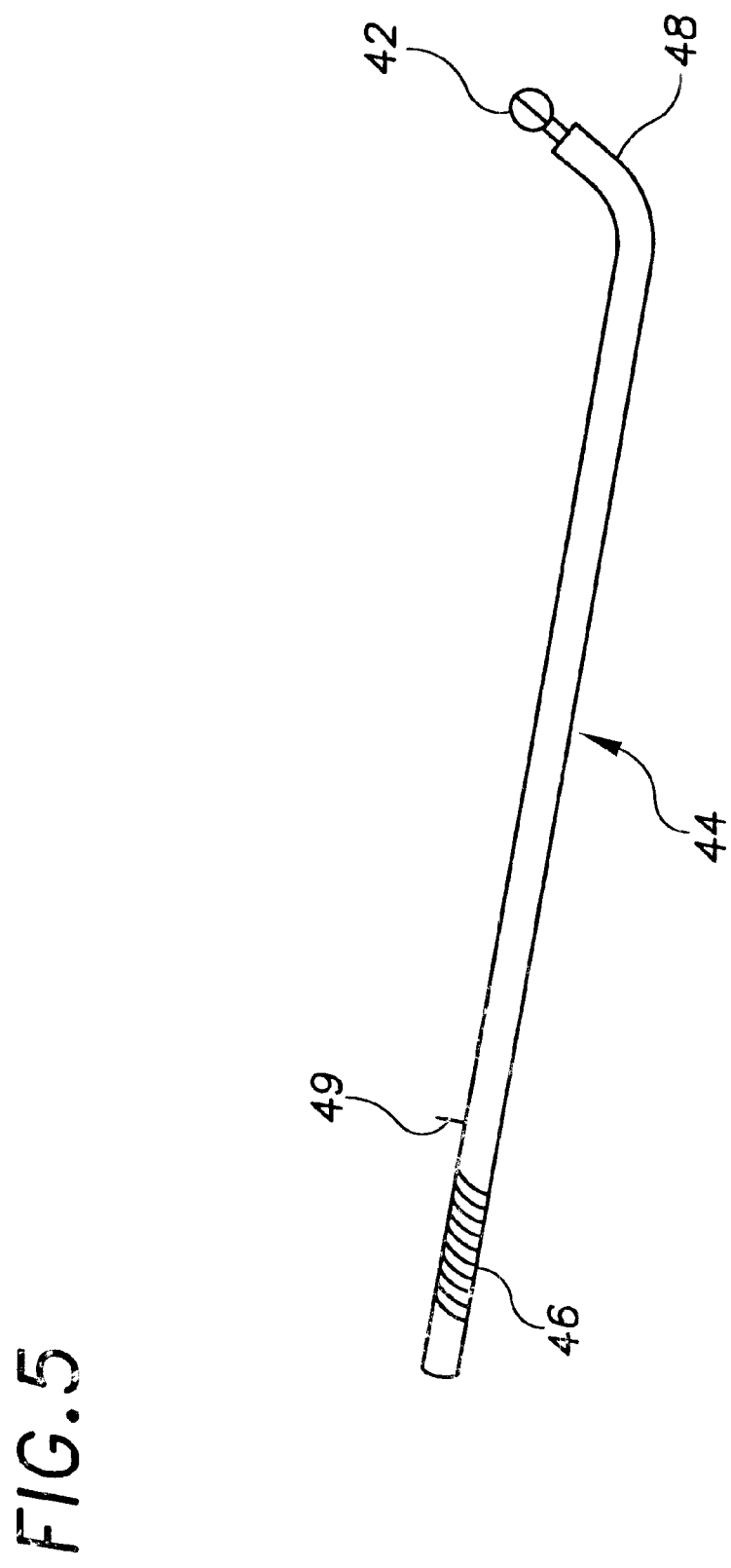
FIG. 5 shows a feeder operatively connected to a feeding pole.

Referring to FIG. 5, feeding pole 44 has a proximal end 46 held by the user during use and a distal bent end 48 that is inserted through support members 18, 20, and 22 to a position below inlet 30 of transparent habitat structure 26 (see FIG. 1). Feeding pole 44 is used to deliver to aquatic habitat extension 1 feed (not shown) contained in a feeder 42 placed at the distal end of pole 44. When feeder 42 is in position under inlet 30, a trigger 49 is reversibly actuated to release feed. Upon the opening of feeder 42, any feed contained therein is freed to float upwards to the top of the water in transparent habitat structure 26 through inlet 30. To encourage the entrance of animals into the interior chamber 28, the feed used in this application should be somewhat buoyant. In addition, some air is typically left at apex 37 of interior chamber 28, so that when feed is released into interior chamber 28 it floats normally to the surface of the water remaining within interior chamber 28.

Figure 6:
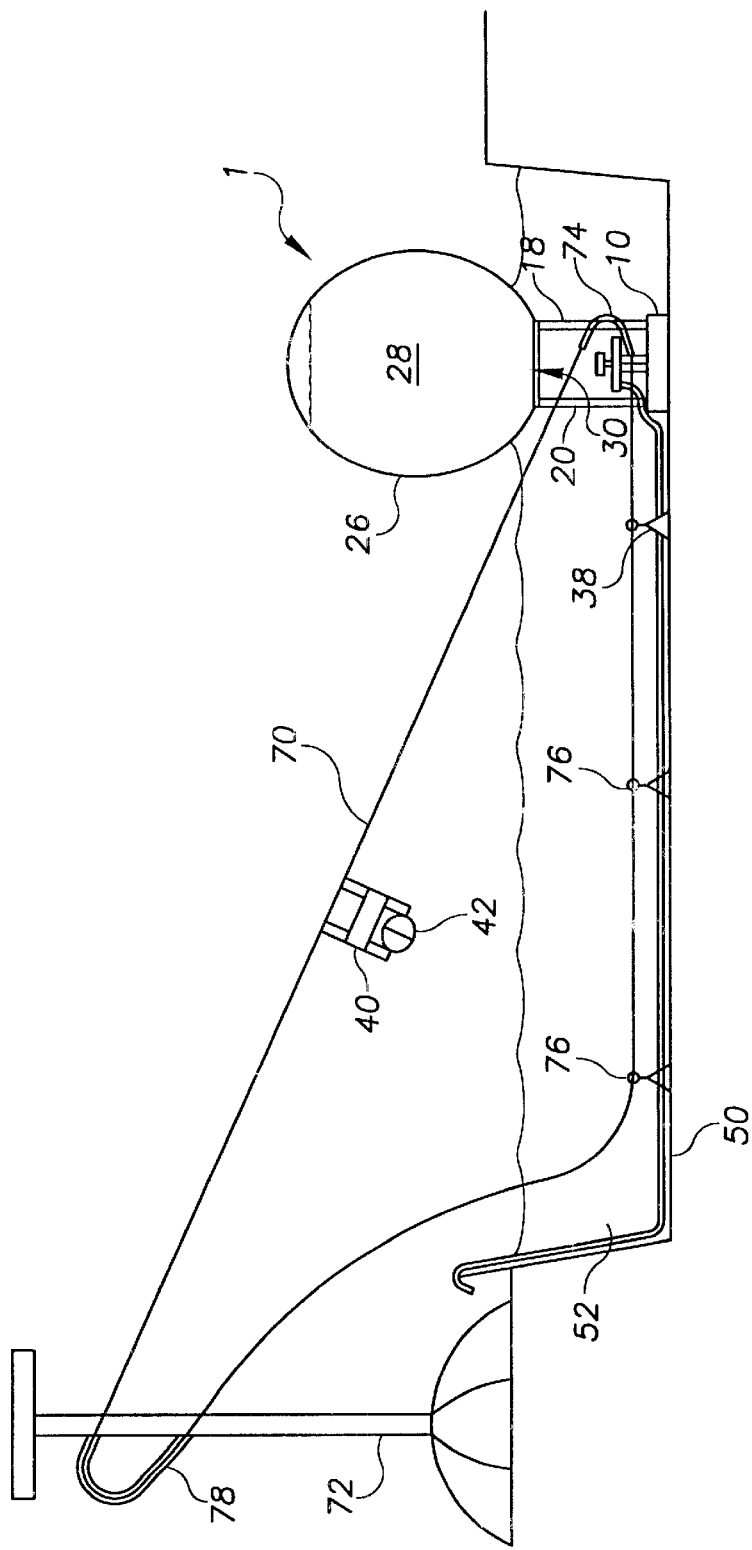
FIG. 6 shows a feeder operatively connected to a feeding platform.

Referring to FIG. 6, in an alternate embodiment of feeding assembly 40, a feeding line 70 is used to deliver feeder 42 from a feeding platform 72 to a point under transparent habitat structure 26, such that when feeder 42 is opened, the feed contained therein (not shown) is freed to float upwards to the surface of the water remaining in interior chamber 28. Feeding line 70 is a flexible closed loop that can be manipulated to reversibly move feeding assembly 40 from aquatic habitat extension 1 to a feeding platform 72 located external to aquatic habitat extension 1. Feeding line 70 extends from a feeding platform 72 to a location below inlet 30 of transparent habitat structure 26, where line 70 is held in place by a curved guide 74. Curved guide 74 redirects line 70 toward the bottom of body of water 52; line guides 38 thereafter return to feeding platform 72 through a curved guide 78. In this embodiment, line guides 38 are equipped with a plurality of eye loops 76. Eye loops 76 allow the movement of line 70 while preventing line 70 from tangling along the bottom 50 of body of water 52. Curved guides 74 and 78 and the plurality of eye loops 76 allow the movement of line 70 through them, but are too small to allow feeding assembly 40 to pass through. Feeding assembly 40 is fixedly attached to feeding line 70, such that when the closed loop that comprises feeding line 70 is manipulated, feeding assembly 40 is moved. Preferably, platform 72 is located out of body of water 52, such that when feeding line 70 is used to return feeding assembly 40 to feeding platform 72, the user can easily open an empty feeder 42 and replace feed therein. Curved guide 78 restricts the movement of feeding assembly 40 such that feeding assembly 40 can only be moved between platform 72 and aquatic habitat extension 1, and will not pass through line guides 38. The movement of line 70 can be actuated either manually by a user, or the process can use a motor (not shown) or other well known means to automate the movement of feeding line 70.

When line 70 is manipulated such that feeder 42 touches curved guide 74, feeder 42, fixedly attached to line 70, is halted in its progression and stopped beneath inlet 30. With additional force applied to line 70 to move feeder 42 towards curved guide 74, swing arms 80 of feeder 42 are forced open and the feed is released to float upward through inlet 30 and into interior chamber 28.

Figure 7A:
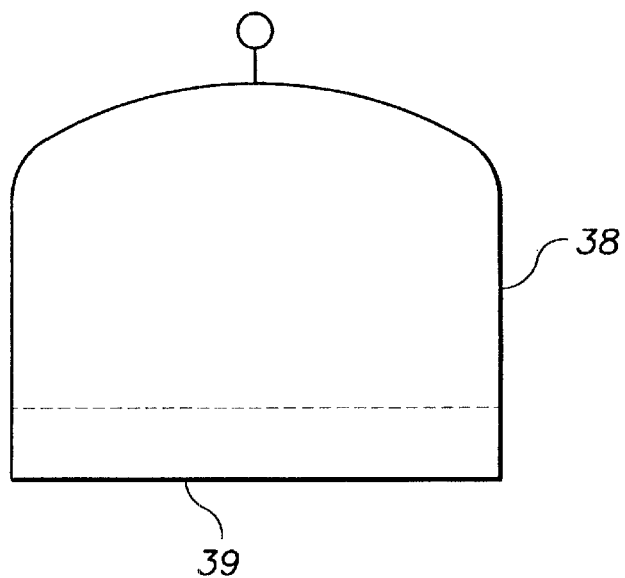
FIGS. 7A, 7B show two embodiments of a line guide.
Figure 7B:
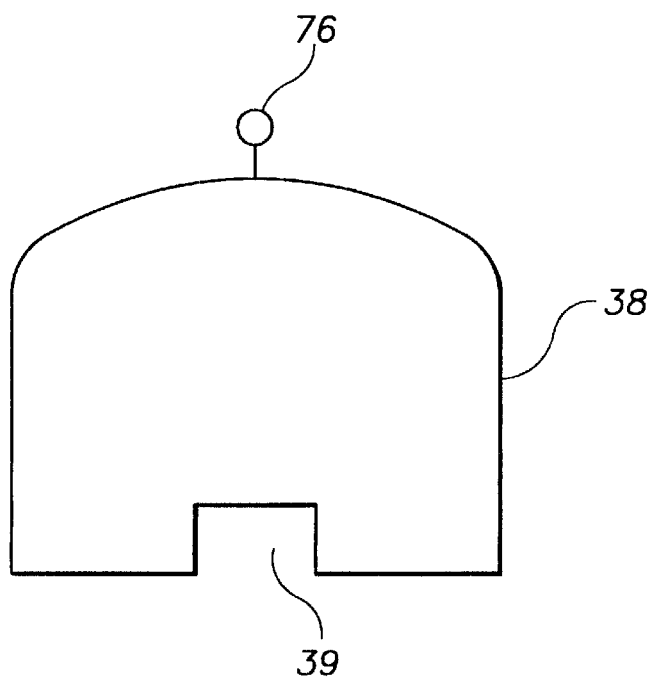

Referring to FIG. 7A–7B, line guides 38 are constructed such that their lower surface is substantially flat except for a guide groove 39. Line guides 38 are preferably of sufficient weight and mass to securely anchor evacuation line 36, power line 62, and transparent water tube 86 to the bottom 50 of a body of water 52 simultaneously. Alternatively, line guides 38 and base 10 can be secured to an artificial surface (not shown) such that aquatic habitat extension 1 can be used in a body of water flowing past or around aquatic habitat extension 1. Guide grooves 39 prevent any line running to aquatic habitat extension 1 from leaving the bottom 50 of body of water 52 or becoming tangled.

Figure 8:
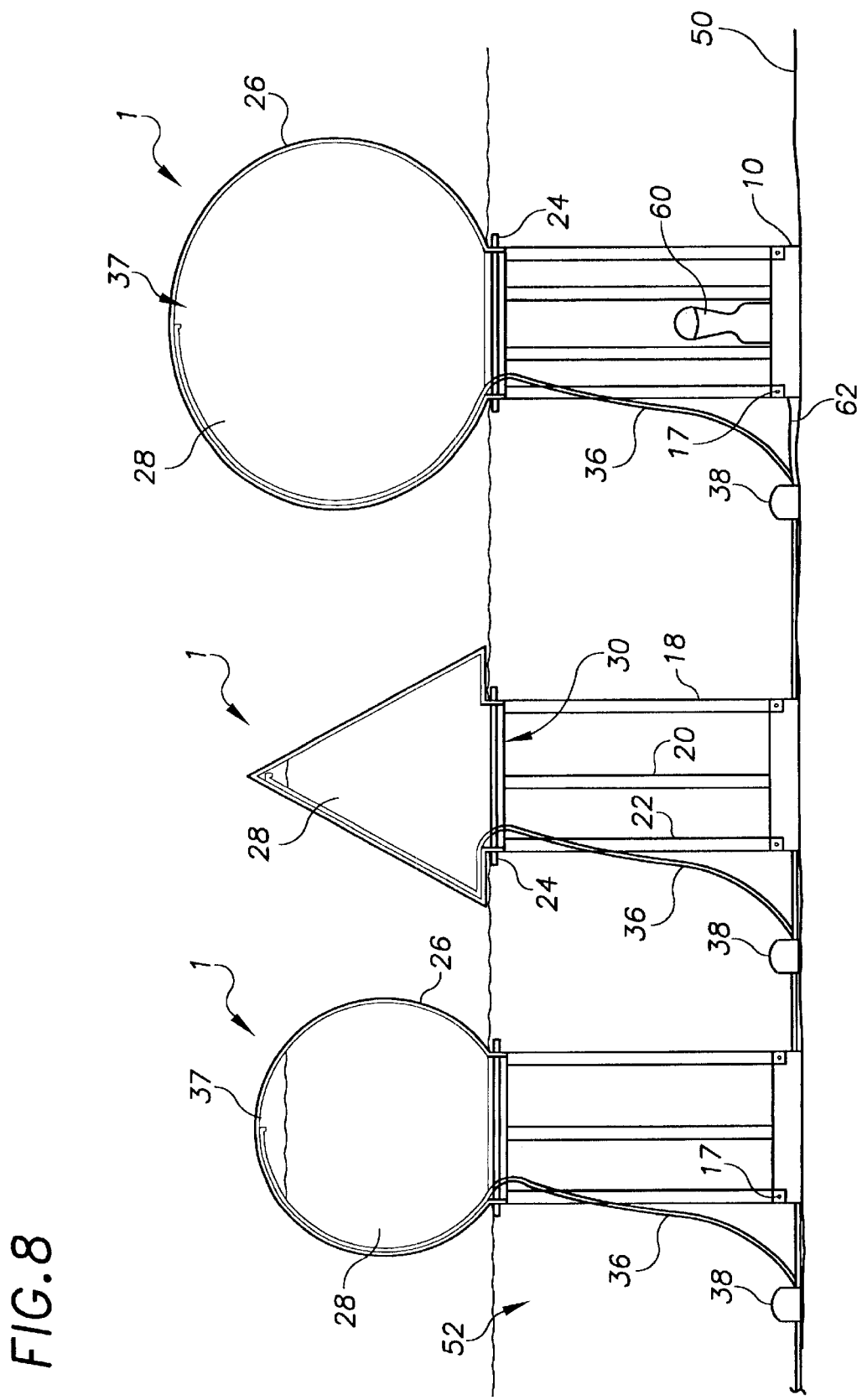
FIG. 8 shows a plurality of aquatic habitat extensions in a pond.

Referring to FIG. 8, a plurality of aquatic habitat extensions 1 are in a pond. Each of the individual extensions I can be independently controlled with regard to water level and consequent presence or absence of a vacuum, size or dimensions of transparent habitat structure 26, light source 60, or tinting. If desired, multiple extensions 1 are used simultaneously in aquaria, water gardens, or ponds. Particularly in outdoor applications, the use of multiple habitat extensions greatly enhance the recreational and aesthetic value of aquaria, water gardens, or ponds. When appropriately secured, extensions 1 are used in flowing streams, rivers or other occasions in which an underlying body of water 52 is moving as long as leading edge 34 of the peripheral rim 32 remains below the surface of said body of water 52.

Preferably, the transparent habitat structure 26 is spherical in shape. However, any enclosed shape that retains a partial vacuum can be used as a habitat structure. This variety of shapes can extend from those strictly geometric in dimension to purely decorative such as in the shape of a golf ball, football, globe or an artistic rendering. The spherical design provides structural integrity and extensive magnification due to the curvature of the habitat walls. Likewise, a rectangular design is used to prevent extensive magnification.

In a variation of the habitat herein disclosed, the size of the habitat is such that it allows the entry individuals to enter interior chamber 28. This embodiment is useful in diving instruction or other recreational applications.

Figure 10:
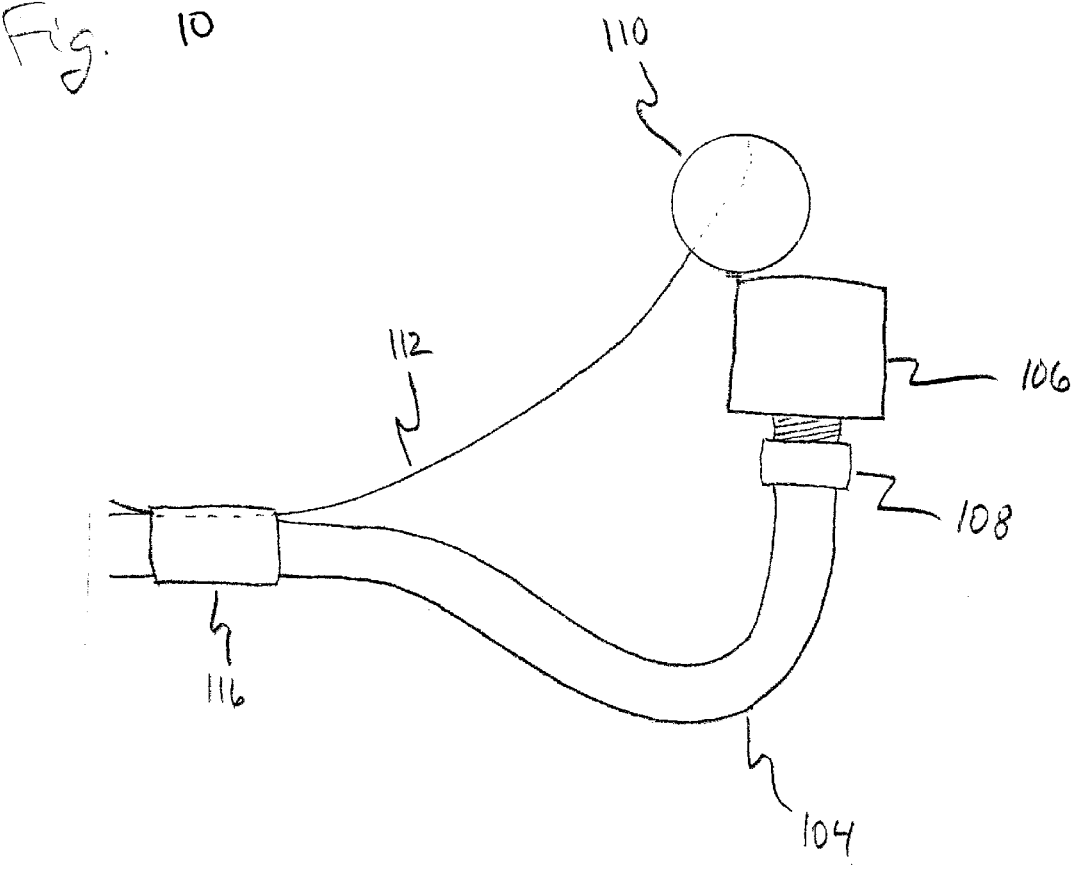
FIG. 10 shows the delivery of feed to an aquatic habitat extension device using a bent feeding pole.

In a variation on the use of evacuation line 36 an excess length of flexible tubing is used as evacuation line 36. To end 35 of this tubing 36 a watertight flotation ball 41 is fixedly attached such that the end 35 is kept above the level of water present in interior chamber 28 of transparent habitat structure 26. As air is removed from interior chamber 28 through evacuation line 36, flotation ball 41 will exert an upward force on end 35 moving the excess length of evacuation line 36 upwards towards the apex 37 of interior chamber 28. In this manner the flexible tubing extension line 1 evacuation line 36 is able to reversibly remove water from the interior of transparent habitat structure 26. A fountain like effect can also be created through the use of floatation ball 41. If the water level in transparent habitat structure 26 is sufficiently free of water, water can be forced through evacuation line 36 and into chamber 28 by a conventional water pump element 90 or other means. Since the air remaining inside interior chamber 28 is not removed the water level is maintained and a fountain like Referring to FIG. 9–10, a bent pole feeding apparatus includes an extended shaft 102 having a bent distal end 104 attached to a feed chamber 106 using a feed chamber attachment 108. The bent pole feeder optionally includes a water inhibitor 109 between feed chamber 106 and chamber attachment 108. A feed chamber cover 1 10 is hingeably attached to feed chamber 106. A pole connector 116 connects the extended shaft 102 and the bent distal end 104. A monofilament pull line 112, is affixed to feed chamber cover 110, thus providing opening means for a user to open the feed chamber such that feed is released into an aquatic habitat extension device. In a variation on the use of extended shaft 102, feed chamber 106 and feed chamber attachment 108 are removed and extended shaft 102 is used as an evacuation line to remove or add air or water to transparent habitat structure 26.

Figure 11:
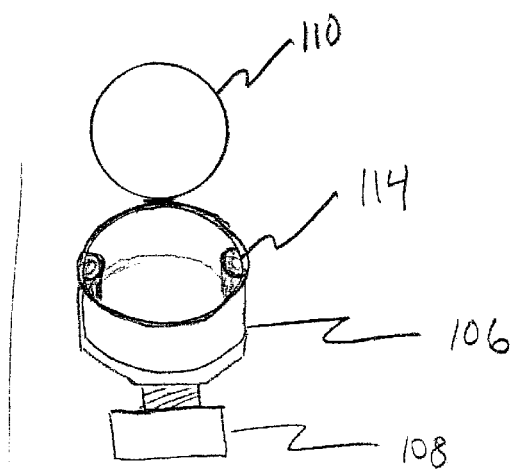
FIG. 11 shows the open position of a feed chamber employing magnets.
Figure 12:
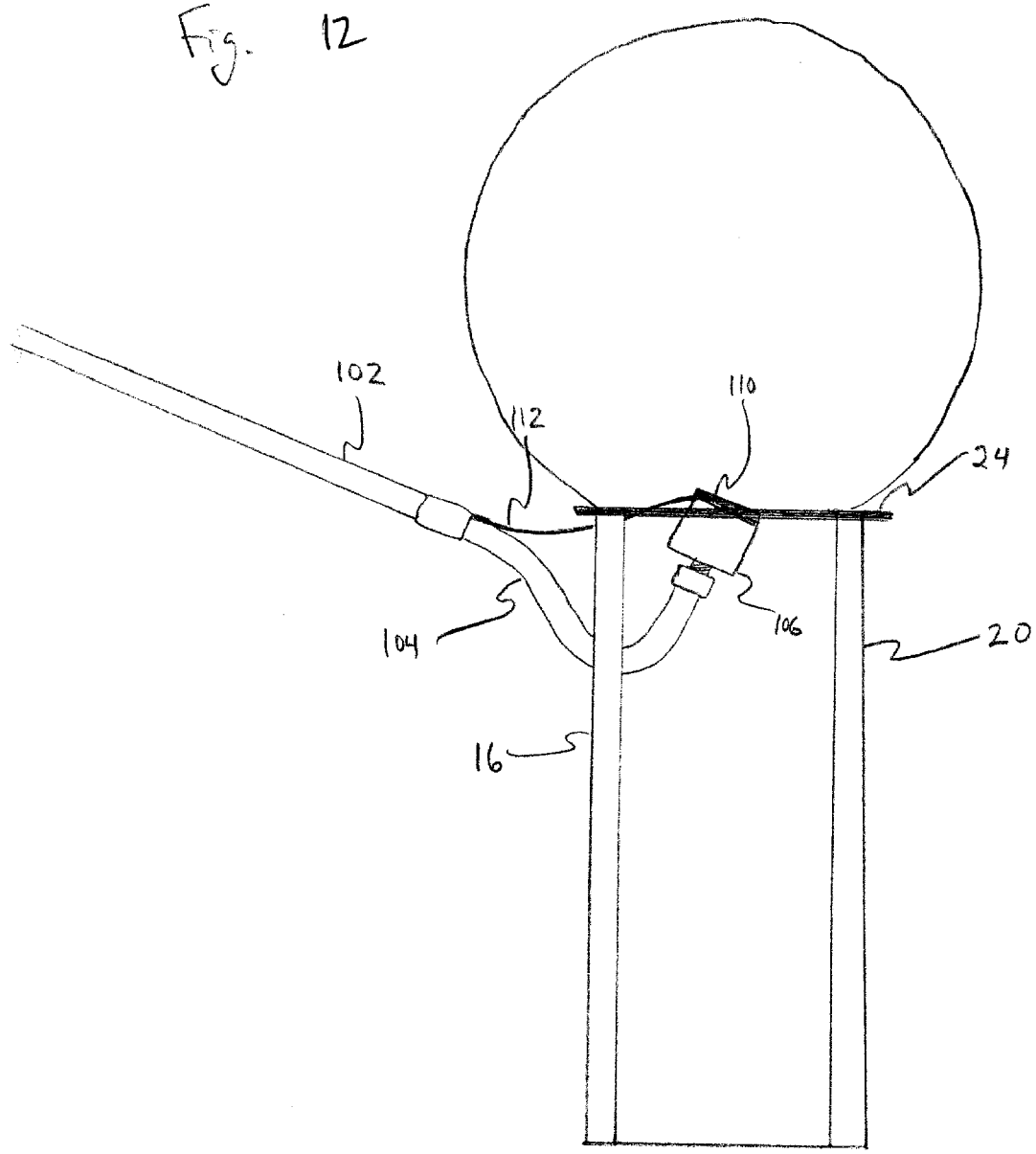
FIG. 12 shows a bent feeding pole in position below a habitat structure.

Referring to FIG. 11, magnets 114 hold feed chamber cover 110 in a closed position, until a user is ready to release the feed into a transparent habitat structure. Feed for aquatic animals is placed inside the feed chamber 106; feed chamber cover 110 is closed by hand. Magnets 114 hold the feed chamber cover 110 in a closed position. The user then manipulates the feeding apparatus such that the feed chamber 106 is placed under an aquatic extension device. The user then gently pushes up on the feeding apparatus such that the monofilament pull line 112 contacts the top ring of the globe base, thus causing the feed chamber cover 110 to open and allowing the feed to float into the globe (see FIG. 12).

Figure 13:
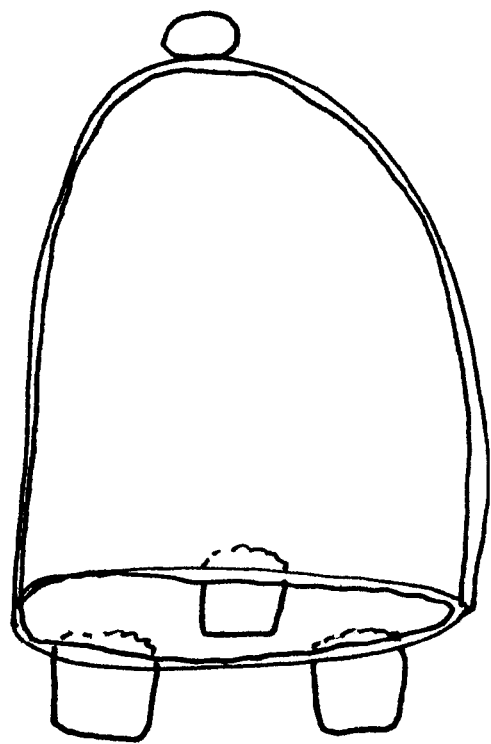
FIG. 13 shows an alternate embodiment of the aquatic habitat structure.

Referring to FIG. 13, in a simple alternate embodiment of the invention, the transparent hollow habitat structure rests on a plurality of support structures.

Accordingly, it is to be understood that the embodiments of the invention herein described are merely illustrative of the application of the principles of the invention. Reference herein to details of the illustrated embodiments are not intended to limit the scope of the claims, which themselves recite those features regarded as essential to the invention.

What is claimed is:

1. A feeding apparatus for an aquatic habitat extension device, comprising:
   a) an elongated shaft having a proximal end and a distal end; operatively connected to
   b) a feed chamber for containing a feed mixture;
   c) a feed chamber cover that can be placed in an open position or a closed position, hingeably attached to said feed chamber;
   d) securing means for maintaining said feed chamber cover in a closed position until a user opens said feed chamber;
   e) opening means for opening said feed chamber such that a feed mixture is released; and
   f) attaching means for attaching said feed chamber to said distal end of said elongated shaft, wherein said distal end of said elongated shaft includes a bend, such that a feed chamber attached to said distal end of said shaft extends in a vertical direction above said shaft when said shaft is in a horizontal position.

2. The feeding apparatus of claim 1, wherein said feed chamber includes a water inhibitor.

3. The feeding apparatus of claim 1, wherein said means for maintaining said feed chamber cover in a closed position includes at least one magnet.

4. The feeding apparatus of claim 1, wherein said opening means includes a monofilament line affixed to said feed chamber cover.

* * * * *

UNITED STATES PATENT AND TRADEMARK OFFICE
CERTIFICATE OF CORRECTION

Figure 9:
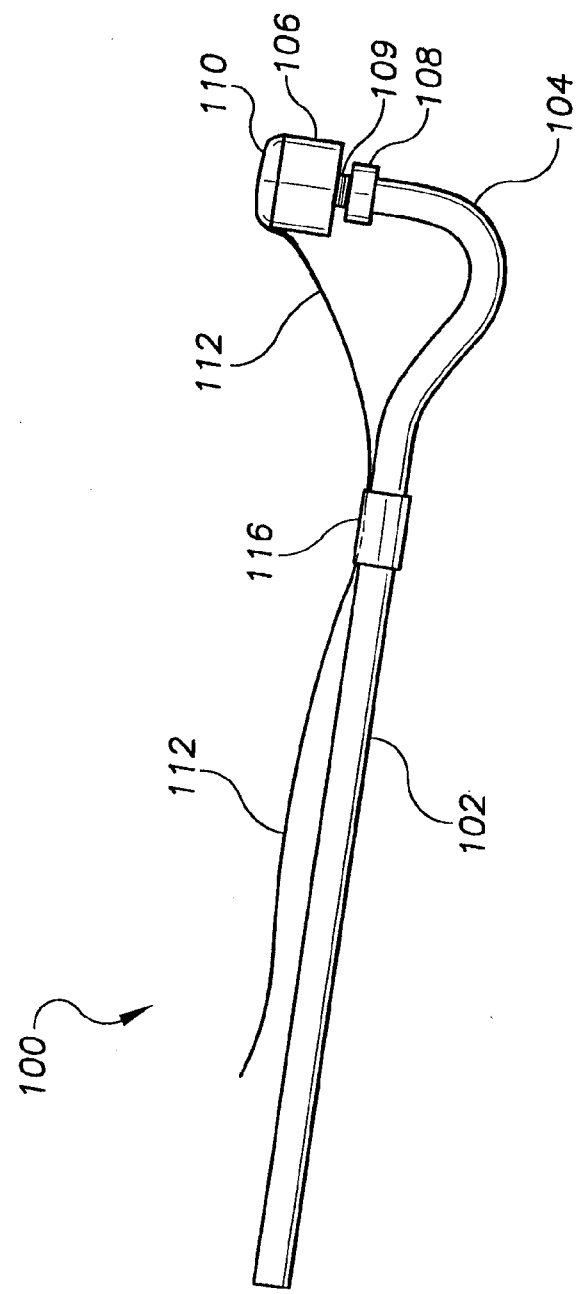
FIG. 9 shows the closed position of a feed chamber operatively connected to a bent feeding pole.
Figure 10:
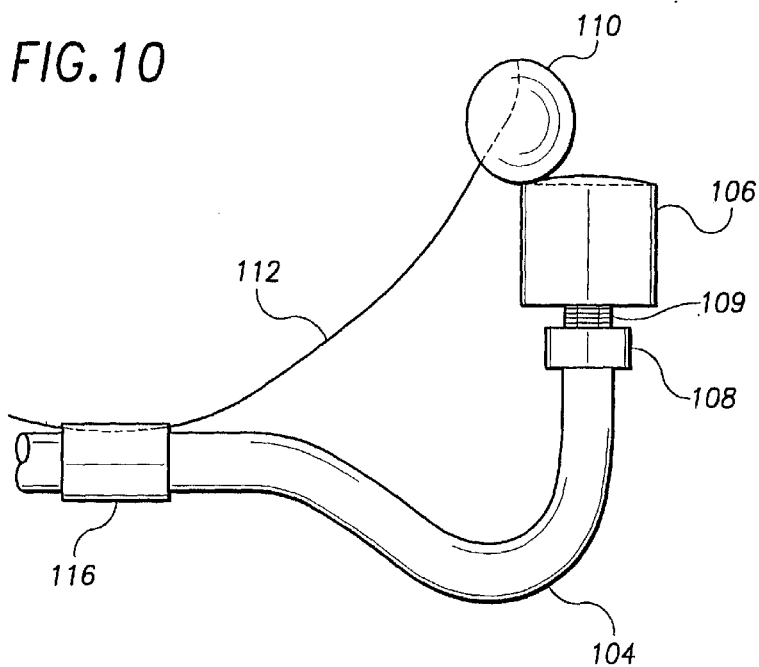
Figure 11:
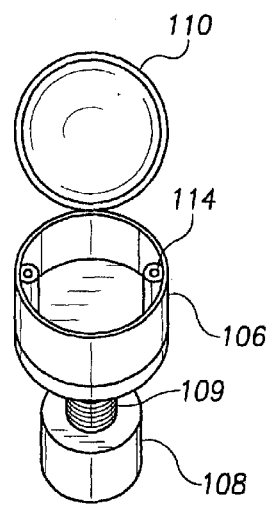
Figure 12:
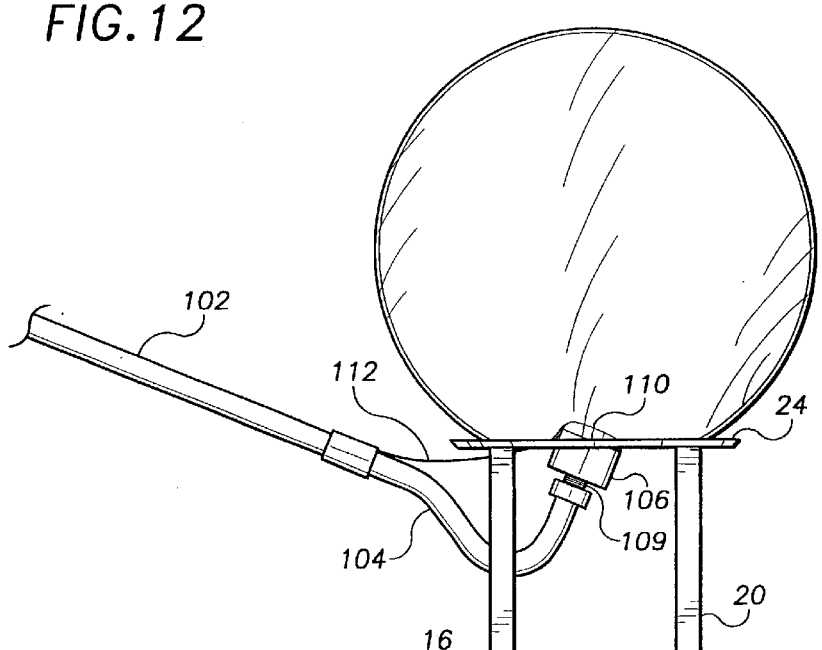
Figure 13:
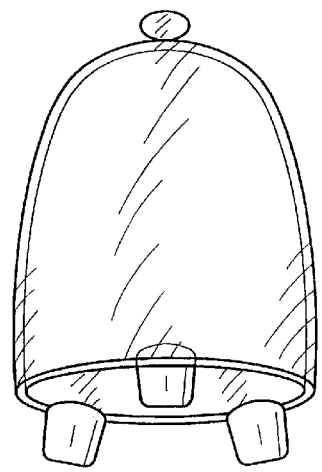

PATENT NO.   : 6,378,457 B1
DATED        : April 30, 2002
INVENTOR(S)  : Charles E. Themar It is certified that error appears in the above-identified patent and that said Letters Patent is hereby corrected as shown below:

<u>Title page,</u>
Showing an illustrative figure should be deleted, and substitute therefore the attached title page consisting of Fig. 9

<u>Drawings,</u>
Sheet consisting of fig.(s) 9-13 should be deleted and substitute therefore the attached drawing sheets 9-11.

Signed and Sealed this

Twelfth Day of November, 2002

Attest:

Attesting Officer

JAMES E. ROGAN
Director of the United States Patent and Trademark Office